(12) United States Patent
Cloutier et al.

(10) Patent No.: US 7,715,887 B2
(45) Date of Patent: May 11, 2010

(54) LOW POWER DISTRIBUTION SYSTEM FOR AN UNATTENDED GROUND SENSOR SYSTEM

(75) Inventors: Scott Cloutier, Fairport, NY (US); Adam Kent, Fairport, NY (US); Joseph Presicci, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 818 days.

(21) Appl. No.: 11/598,913

(22) Filed: Nov. 14, 2006

(65) Prior Publication Data
US 2008/0114914 A1 May 15, 2008

(51) Int. Cl.
*H04B 1/38* (2006.01)
(52) U.S. Cl. ............... 455/574; 455/127.1; 455/127.5; 455/572; 340/870.07; 361/119
(58) Field of Classification Search ............... 455/574, 455/127.1, 127.5, 572, 13.4, 571; 340/870.07; 361/119
See application file for complete search history.

(56) References Cited

U.S. PATENT DOCUMENTS

| | | | | |
|---|---|---|---|---|
| 3,671,849 A * | 6/1972 | Kingston | ............... | 323/319 |
| 4,140,193 A * | 2/1979 | Miller | ............... | 180/9.46 |
| 5,117,430 A | 5/1992 | Berglund | | |
| 5,218,552 A | 6/1993 | Stirk | | |
| 5,600,310 A * | 2/1997 | Whipple et al. | ......... | 340/3.51 |
| 5,870,695 A | 2/1999 | Brown | | |
| 5,986,539 A * | 11/1999 | Johansson et al. | ......... | 370/535 |
| 6,072,585 A * | 6/2000 | Dutton et al. | ......... | 358/1.12 |
| 6,420,975 B1 * | 7/2002 | DeLine et al. | ......... | 340/815.4 |
| 6,434,452 B1 * | 8/2002 | Gray | ......... | 701/19 |
| 6,522,935 B1 * | 2/2003 | Imaizumi et al. | ......... | 700/12 |
| 6,553,336 B1 | 4/2003 | Johnson | | |
| 6,763,289 B2 * | 7/2004 | Leonard et al. | ......... | 701/3 |
| 6,885,927 B2 * | 4/2005 | Arimura | ......... | 701/41 |
| 6,906,632 B2 * | 6/2005 | DeLine et al. | ......... | 340/815.4 |
| 6,975,926 B2 * | 12/2005 | Schanin | ......... | 700/296 |
| 7,020,701 B1 * | 3/2006 | Gelvin et al. | ......... | 709/224 |
| 7,035,240 B1 | 4/2006 | Balakrishnan | | |
| 7,311,115 B1 * | 12/2007 | Wendell et al. | ......... | 137/119.1 |
| 7,486,495 B1 * | 2/2009 | Diederichs et al. | ......... | 361/119 |
| 7,507,001 B2 * | 3/2009 | Kit | ......... | 362/276 |
| 2001/0010541 A1 | 8/2001 | Fernandez | | |
| 2003/0020603 A1 * | 1/2003 | DeLine et al. | ......... | 340/425.5 |
| 2003/0139687 A1 | 7/2003 | Abreu | | |
| 2004/0059396 A1 | 3/2004 | Reinke | | |
| 2004/0064218 A1 * | 4/2004 | Schanin et al. | ......... | 700/286 |
| 2004/0078662 A1 | 4/2004 | Hamel | | |
| 2005/0146219 A1 | 7/2005 | Pincu | | |
| 2007/0210923 A1 | 9/2007 | Butler | | |
| 2009/0232328 A1 * | 9/2009 | DeLine et al. | ......... | 381/86 |

FOREIGN PATENT DOCUMENTS

GB 2421153 6/2006
WO 2005/043930 5/2005

* cited by examiner

*Primary Examiner*—Minh D Dao
(74) *Attorney, Agent, or Firm*—Harness, Dickey & Pierce, PLC (57) ABSTRACT

A sensor system includes N sensor system modules that each include respective sensor function modules for processing and communicating signals from at least one external detector. M slave modules selectively control power to the sensor function modules. M and N are integers greater than one. A master power control module serially controls the M slave modules via a bus based on functions of the sensor function modules.

23 Claims, 6 Drawing Sheets

LOW POWER DISTRIBUTION SYSTEM FOR AN UNATTENDED GROUND SENSOR SYSTEM

CROSS-REFERENCE TO RELATED APPLICATIONS

This application is a related to U.S. patent application Ser. No. 11/598,910 entitled "MULTIPURPOSE UNATTENDED SENSOR NODE WITH RELAY CAPABILITY" and filed concurrently herewith. The disclosure of this application is incorporated herein by reference.

FIELD

The present disclosure relates to sensor systems, and more particularly to unattended sensor systems.

BACKGROUND

Throughout the world, military and homeland security forces face an increasing need to provide safety and security to troops and high-value assets. Wireless surveillance systems are emerging as a way of meeting this need. However, when developing a communications system for military application, a variety of obstacles need to be overcome. For example, remotely located wireless surveillance systems often include relatively large 32-bit processors that may rapidly consume limited power resources. Generally, however, remotely located portions of wireless surveillance systems should be configured to operate in a manner that conserves power resources.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A sensor system includes N sensor system modules that each include respective sensor function modules for processing and communicating signals from at least one external detector. M slave modules selectively control power to the sensor function modules. M and N are integers greater than one. A master power control module serially controls the M slave modules via a bus based on functions of the sensor function modules.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 1:
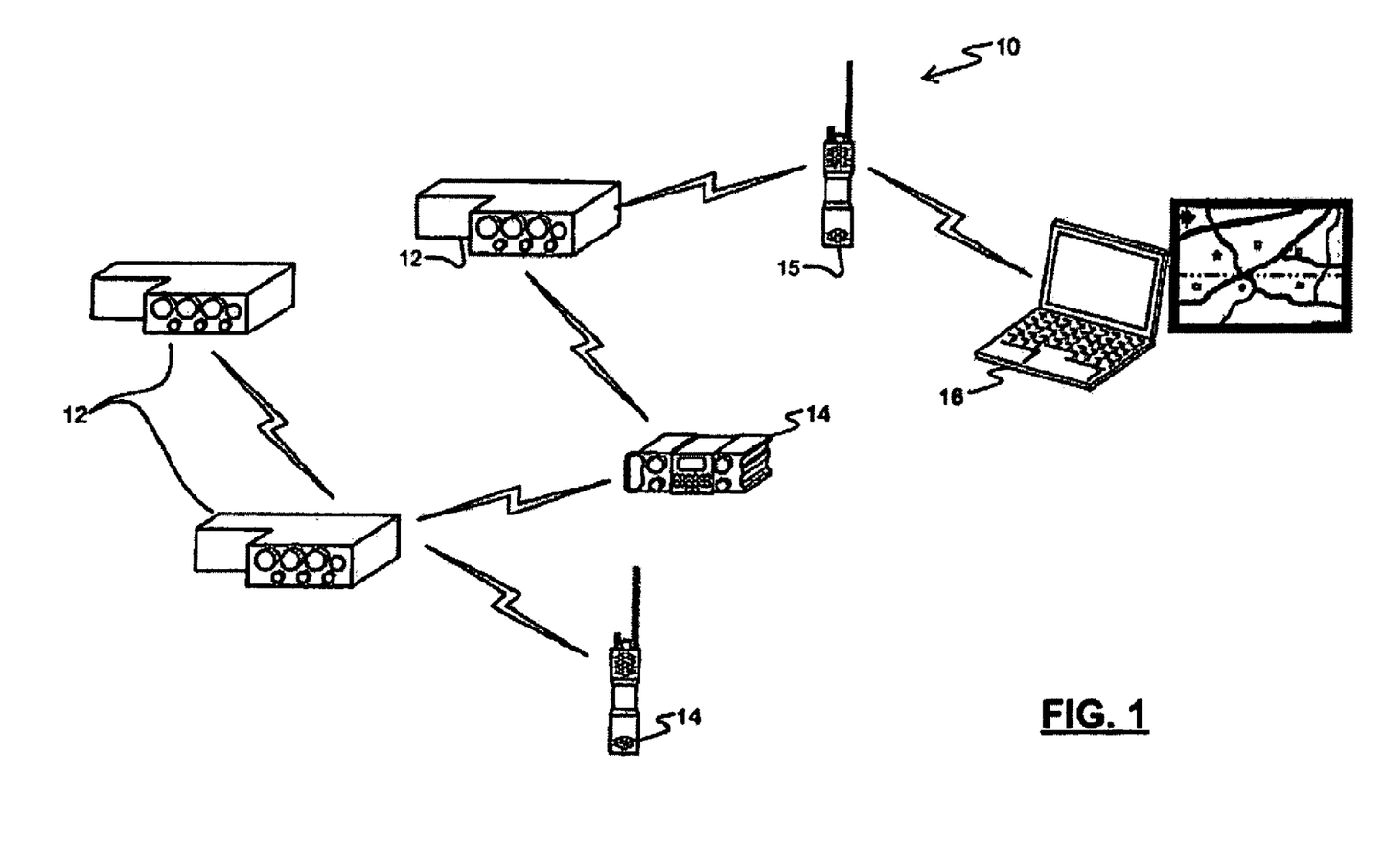
FIG. 1 is a diagram of an exemplary surveillance system.

Referring now to FIG. 1, an exemplary intrusion detection and surveillance system 10 or unattended ground system is illustrated. The system 10 includes a plurality of unattended sensor nodes 12 and one or more monitoring devices 14 and/or communication devices, such as radios 15. Sensor nodes 12 are configured to gather surveillance data and broadcast the data across a wide area wireless network in a manner further described below. Surveillance data may be intended for a dedicated command node or gateway 16 and/or may be intercepted by various monitoring devices 14 residing in the network. It is understood that the sensor nodes 12 may also serve as relays between other devices in the network.

Figure 2:
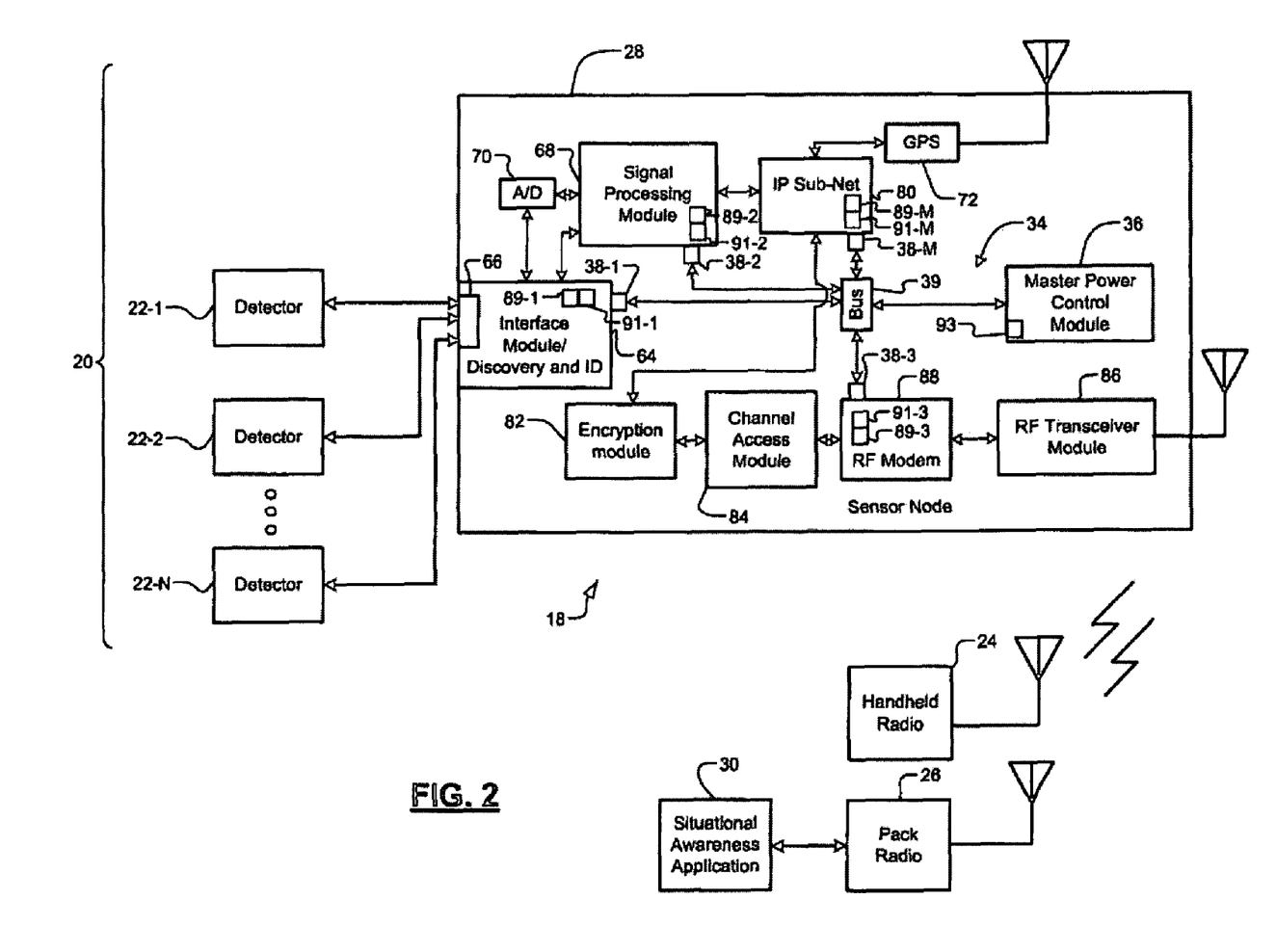
FIG. 2 is a functional block diagram of an intrusion detection and surveillance system according to the present disclosure.
Figure 3A:
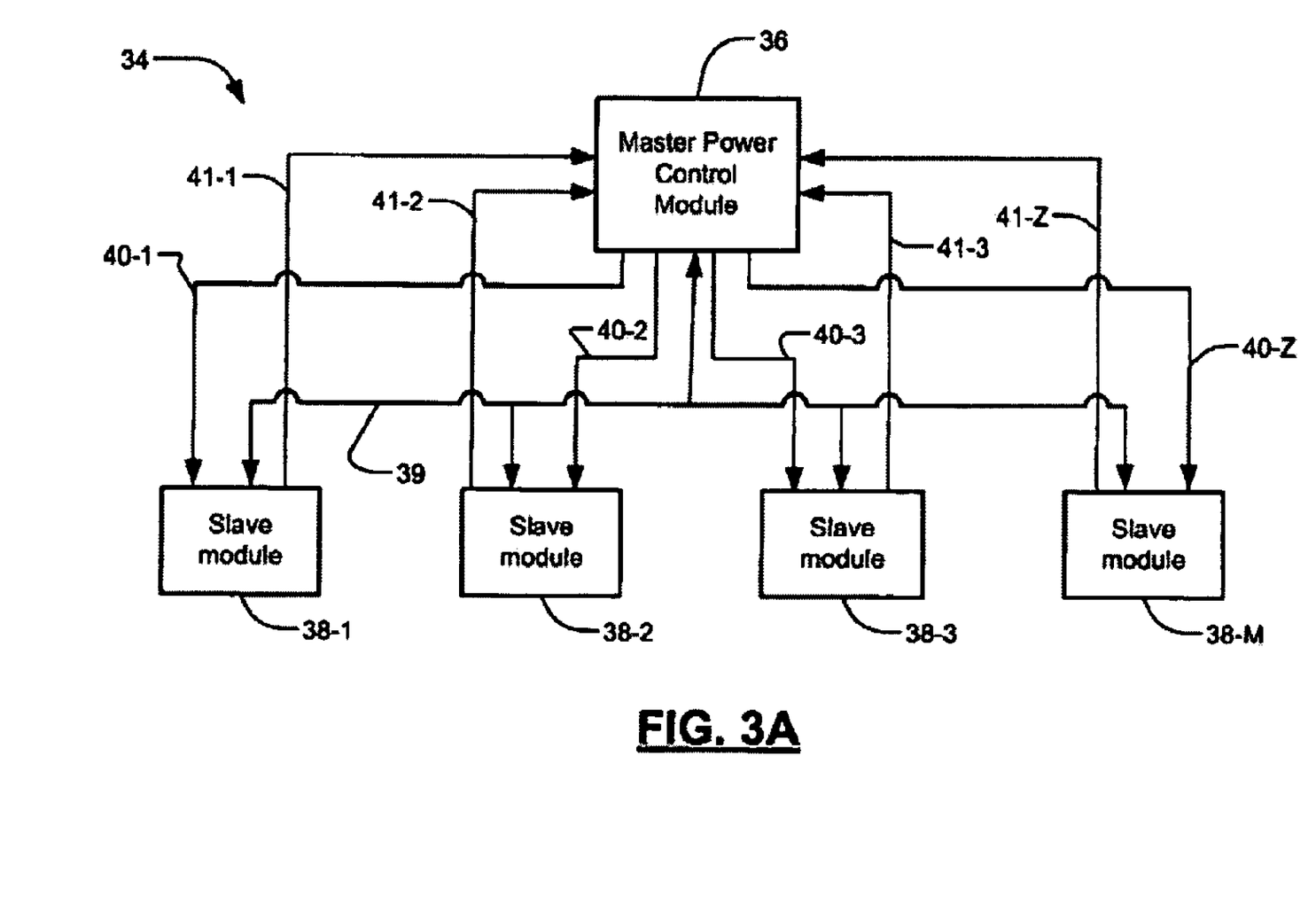
FIG. 3A is a functional block diagram of a distributed processor system according to the present disclosure.
Figure 3B:
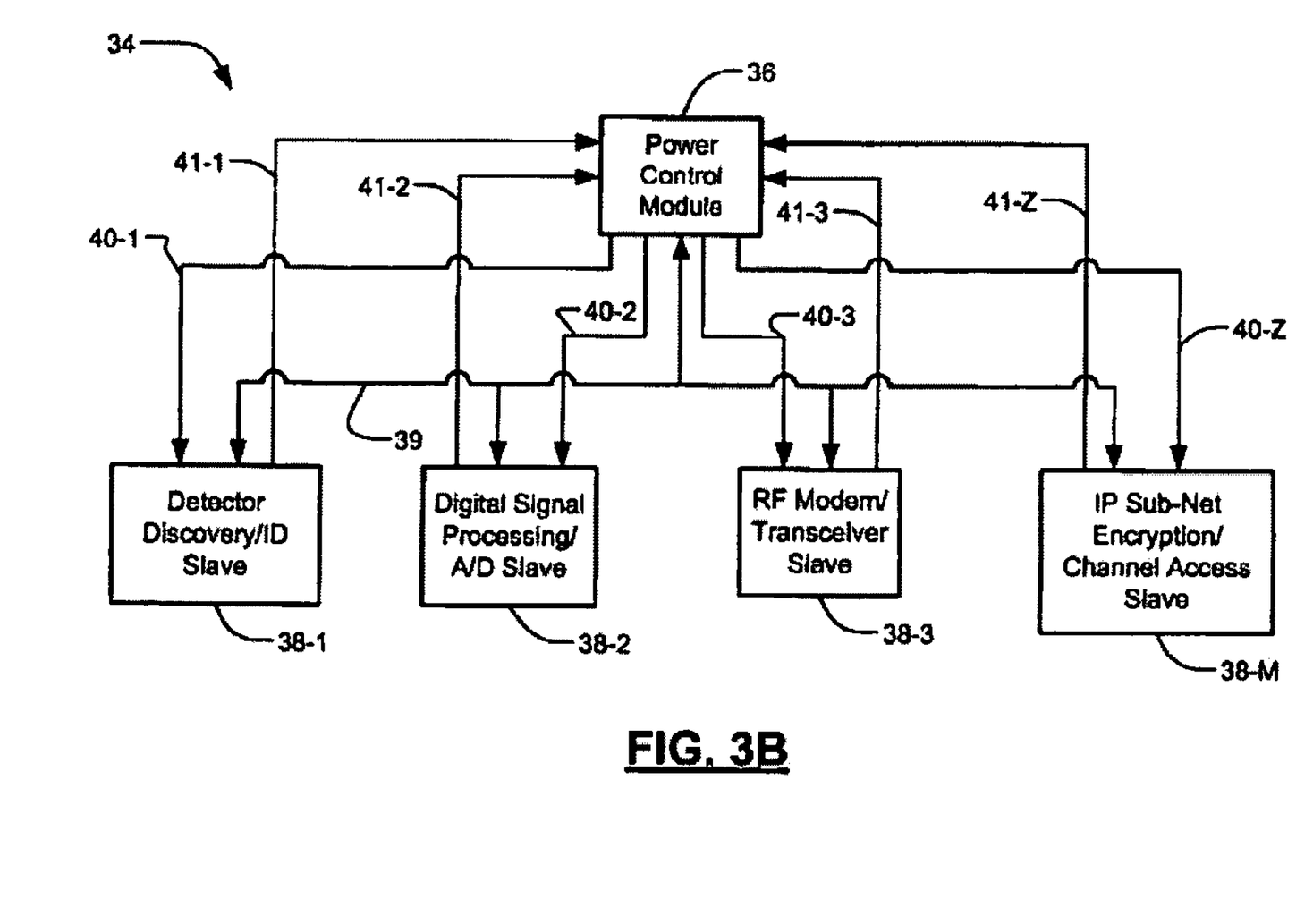
FIG. 3B is a functional block diagram of a distributed processor system according to the present disclosure.

Referring now to FIGS. 2, 3A, and 3B, an exemplary intrusion detection and surveillance system 18 includes a sensor node 20. A sensor node 20 includes one or more detectors 22-1, 22-2, . . . , 22-3 (collectively detectors 22) that communicate with standard military handheld and/or pack radios 24, 26, through a "sensor" 28 or sensor system. The detectors 22 generate signals in response to a physical stimulus proximate to the detectors 22 and include an internal power source or receive power from, for example, the sensor 28. The radios 24, 26 communicate with gateways, such as situational awareness applications 30 that display sensor alarms in a geographical context.

A distributed processor system 34 of the surveillance system 18 includes a master control module 36 (master power control module) that communicates with multiple slave modules 38-1, 38-2, . . . , 38-M (collectively slave modules 38) through a common bus 39. Any or all of the control module and slave modules 36, 38 may be in a sensor, relay, and/or gateway. The control and slave modules 36, 38 are networked low power 16-bit mixed signal processors, but numerous other types of processors may also be used in accordance with the present disclosure. As in FIGS. 3A and 3B, the control module 36 resets the slave modules 38 through reset lines 40-1, 40-2, . . . , 40-M at sensor deployment, start-up, and/or in response to a software or hardware fault. The slave modules 38 interface with or are included within some or all of sensor function modules and/or may function as any or all of the sensor function modules.

The slave modules 38 transfer messages via the bus 39 for various operations according to a signal protocol. For example, when a slave module 38-1 initiates a message transfer (e.g. signals the control module through an attention line 41-1, 41-2, . . . , 41-Z, as in FIGS. 3A and 3B), the slave module 38-1 also determines whether the bus 39 is available. When the bus 39 is available, a slave module 38-1 and/or the control module can communicate and the other slave modules monitor the bus 39 for availability. The slave modules 38 maintain a minimal power state until the bus 39 is available.

The master control module 36 processes bus requests serially in a first-in-first-out (FIFO) arrangement, but various other processing schemes are contemplated, such as processing requests based on operations required by a particular detector signal. Further, the bus 39 may be expandable to include additional slave modules that may communicate with the master control module 36 and corresponding attention and reset lines. The bus 39 is also capable of running in either a master-slave or a multi-master mode where two masters can communicate in a peer-to-peer configuration (e.g. Ethernet) with appropriate access, contention, detection, and recovery.

In another embodiment, the master control module 36 may be similarly connected to multiple master control modules within various components of a surveillance system. The multiple master control modules may act as slave modules to an overall system master control module while still controlling respective slave modules. In other words, a three-tiered system may be formed that includes an upper layer of one or more master control modules. A middle layer of master control modules may act as slave modules to the upper layer and may control a lower layer of slave modules.

In exemplary embodiments, the sensor function modules each include individually or in any combination: an interface module 64 ("interface"), a digital signal processing module 68, an analog-to-digital (A/D) converter 70, a GPS module 72, an internet protocol (IP) sub-net 80, an encryption module 82, a channel access module 84, a radio frequency (RF) transceiver module 86, and an RF modem 88 that will be discussed in detail later. Various exemplary control groupings of sensor function modules for control by the slave modules are illustrated. Each grouping or each sensor function module includes a power supply 89-1, 89-2, . . . , 89-M and/or a clock 91-1, 91-2, . . . , 91-M.

The power supply and clock are controlled or scaled by the respective slave module based on resource requirements of signals received from analog and/or digital detectors 22 that connect to the interface 64. For example, if an analog detector sends a signal to the interface 64, at least A/D conversion and digital signal processing may be performed on the signal. Both of these functions require power resources that are selectively powered up by the slave module as they become necessary. The slave module 38-2 handling these functions is in a minimal power state but automatically powers up in response to detector signals.

Continuing the example, the master control module 36 may control the receive (RX) and/or transmission (TX) data flow to the slave module 38-2 via clocks derived internally from a master control module processor clock 93. In an alternative multi-master bus configuration, two master devices communicate by driving a clock that controls transfer of data for TX data flow. The master control module 36 includes a transmitter, and the slave module 38-2 includes a receiver. Alternatively, the slave module 38-2 may signal the master control module 36 through the bus 39 and may indicate that it is activating and the reason it is activating.

As mentioned, the controlled sensor function module and the control module 36 may include clocks for synchronizing transmitting and receiving data. The slave module 38-2 checks that the clock of the controlled sensor function module is synchronized with a clock of the control module 36. Further, the master control module 36 responds by powering up other slave modules that are required based on the detector signals. Further, the slave module 38-2 may synchronize the clock (for example time-of-day clock) to the clock of the master control module 36. In other words, the sensor 28 may synchronize time-of-day clocks used to correlate various events within the system, for example, correlating images with sensor alarms, etc. The slave module 38-2 also controls or powers only digital signal processes necessary for the specific detector signal. Any or all of the groupings and sensor function modules are software reprogrammable.

The master control module 36 permits and/or controls individual operation of slaves 38-1 to 38-M in any order. In an exemplary embodiment, a switch, such as a transistor, is interposed between the power source and one or more of the slaves 38-1 to 38-M and the master control module 36 controls the gate of the transistor, thereby selectively connecting the power source to one or more of the slaves. In a similar manner, a single switch may be interposed between a given slave and the sensor components which they control or a switch may be interposed between the given slave and each of the sensor components or groups thereof which controlled by the slave. In this way, the slave selectively connects the power source to the sensor component. Other techniques for controlling power consumption of the slaves or sensor function modules are also contemplated by this disclosure.

One possible method for responding to a detector signal includes the control module 36 allowing bus access to the detector discovery/ID slave 38-1. The slave 38-1 determines that a detector is attached and ID the detector based on a detector signal. When the slave 38-1 is finished, it signals the control module, transfers the detector signals to the bus 39, and powers down. The control module 36 then allows access to the bus 39 for a digital signal processing and A/D slave 38-2. The slave 38 powers up and receives and processes the detector signal. The slave 38-2 signals completion of signal processing, signal the control module 36 to allow bus access to another slave, transfer detector signals to the bus 39, and power down.

The control module 36 then allows bus access to an RF modem and transceiver slave 38-3. The slave 38-3 powers up, transmits the detector signals external to the sensor node, and then powers down. The surveillance system 50 may repeat operations in this manner and may alternatively allow bus access to other slaves, such as the IP sub-net encryption and channel access slave 38-M in accordance with the present disclosure.

Referring again to FIGS. 2, 3A, and 3B, the sensor 28 includes an interface 64 that includes a universal port 66 that communicates with both analog and digital detectors 22 that are external to the interface 64. Although only one port 66 and one interface 64 are illustrated, one or more detectors may be integrated with and/or may communicate with numerous ports and/or interfaces. The port 66 or ports include a plurality of pin configurations that are compatible with types of analog detectors, such as passive infrared (PIR), seismic, magneto-resistive, radar, and lidar detectors and/or types of digital detectors, such as imaging and smart acoustic detectors.

A digital signal processing module 68 receives analog detector signals through the interface 64 and an A/D converter

70. The signal processing module 68 also receives digital detector signals through interface 64 and GPS signals through a GPS module 72.

The GPS module 72 is embedded in the sensor 28 and therefrom receives a timestamp as well as positional information. The digital signal processing module 68 in data communication with the GPS module 72 may opt to tag outgoing event messages with a timestamp of when the event occurred and/or positional information for the sensor 28. Other means for determining the current time or capturing positional information for the sensor are also contemplated by this disclosure.

An IP sub-net 80 processes signals from the signal processing module 68 that are encrypted in an encryption module 82. The IP sub-net 80 uses wireless IP voice and/or data channels that can be configured as plain text and/or cipher text, such as Citadel® encryption. A channel access module 84 determines and/or sets access to the encrypted signals for one of the radios 24, 26.

In an exemplary embodiment, the IP sub-net 80, which may include a packet converter, receives data from the signal processing module 68. The packet converter in turn organizes the data received from the signal processing module 68 into one or more data packets. The data packets are defined in accordance with the Internet protocol or some other transport protocol. In this way, the event messages are sent to and received by other IP compatible devices residing in a network, which may include an intrusion detection and surveillance system. It is understood that event messages need not be sent in packet form.

A radio frequency (RF) transceiver module 86 of the sensor 28 communicates with the radios 24, 26 through an RF modem 88. These components may be designed to be compatible with existing military radio technology. In other words, each of these components may be of military grade. For example, the RF modem 88 implement a frequency hopping scheme; whereas, the RF transceiver module 86 is a VHF network module that operates in the frequency range from 30 MHz to 108 MHz. Exemplary RF modems and RF transceiver modules can be found in various military grade radios such as the RF-5800 handheld radio and RF-5800 manpack radios commercially available from Harris Corporation. In this way, the sensor 28 is able to communicate with handheld radios as well as other communication devices deployed within a network. This provides reduced logistics in parts and training. In addition, it minimizes the lifecycle cost of a system if the user already owns a piece of the system or has multiple users.

To reduce channel contention, the sensor 28 also employs the channel access module 84. Channel access is the scheme by which a radio node negotiates access and is granted permission to utilize a shared communication medium. In an exemplary embodiment, the sensor node 20 uses Multiple Access with Collision Avoidance (MACA) protocol or variants thereof. It is envisioned that other channel access protocols may be employed within the broader aspects of this disclosure. However, this protocol is particularly suited for mobile communication devices which use tactical line of sight VHF channels.

Figure 4:
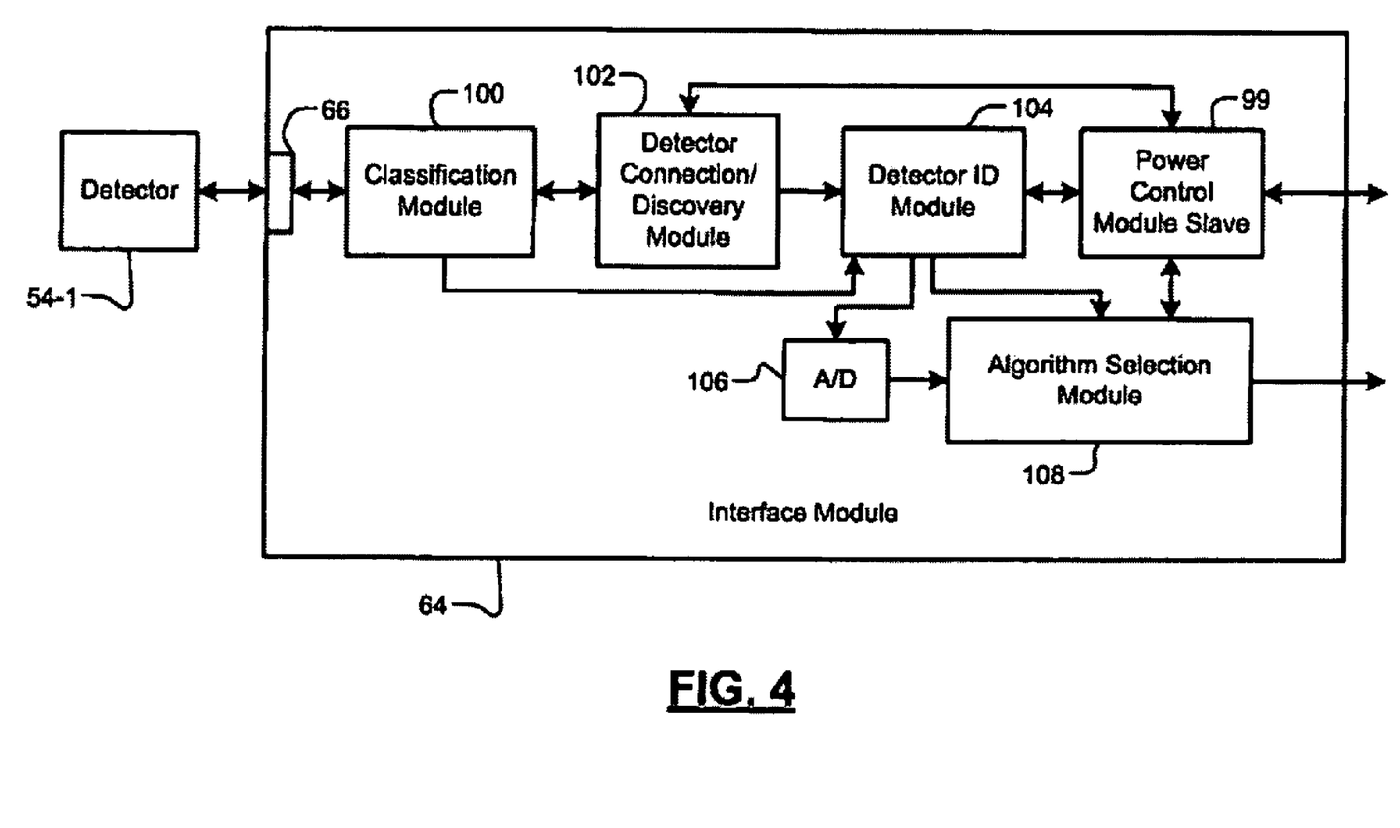
FIG. 4 is a functional block diagram of an interface for an intrusion detection and surveillance system according to the present disclosure.

Referring now to FIG. 4, an exemplary interface 64 is shown to illustrate operations of one of the slave modules. A power control module 99 of an exemplary interface 64 adjusts and/or activates power to the detector 22-1. The power control module 99 is a slave module. In an alternative embodiment the power control module 99 may communicate with a slave module that controls the interface 64. The power control module 99 controls power for the detector 22-1 based on specific power requirements of the detector 22-1. The slave module selectively adjusts power through adjusting the power control module 99 to control any of the following interface modules or functions in an order specific to signal processing requirements of a particular signal.

In an exemplary embodiment, the power control module 99 first powers up a classification module 100 of the interface 64 that automatically classifies that a detector 22-1 is analog or digital. The classification is based on a predetermined indicator, such as a connection configuration between the interface 64 and the detectors 22. The classification may also be based on communications with the detector to determine that it is analog or digital. Such communications may include the classification module 100 requesting data from the detector 22-1, scanning the detector for information, or otherwise determining the classification of the detector 22-1. Following the classification, the power control module 99 then powers down the classification module 100.

The power control module 99 next powers up a detector connection discovery module 102 that automatically determines when a detector 22-1 is connected and/or disconnected based on classification module signals and/or detector signals. In other words, prior to powering down the classification module 100 sends signals to the detector discovery module 102 and also to various signal processing modules within the interface 64. When receiving signals from the classification module 100, the discovery module 102 determines that the detector 22-1 is connected and otherwise determines that the detector 22-1 is not connected or has been disconnected. Alternatively, the classification module 100 generates a signal indicating that the detector 22-1 is detected based directly on signals from the port 66. The power control module 99 then powers down the detector connection discover module 102.

The power control module 99 next powers up a detector identification (ID) module 104 that automatically identifies the type of detector that is connected and appropriate processing steps for the detector 22-1 based on discovery module and/or classification module signals. Either or both an analog-to-digital (A/D) converter 106 and an algorithm selection module 108 process detector signals based on detector ID module signals. The algorithm selection module 108 selects an appropriate algorithm, for example, a software based algorithm, for operating the detector 22-1 and/or processing detector signals.

If the discovery module 102 classifies the detector 22-1 as an analog detector, then current supplied to the detector 22-1 is used by the detector ID module 104 to determine the type of analog detector that is connected. If the discovery module 102 classifies the detector 22-1 as a digital detector, then the power control module 99 powers up a digital communications peripheral module 110, which may be part of the detector ID module 104, that communicates with and/or requests identification from the detector 22-1. The power control module 99 finally power down all interface modules and another slave module, that includes power control, or slave module controlling a power control module for another sensor system activates to further process or transmit detector signals.

Figure 5:
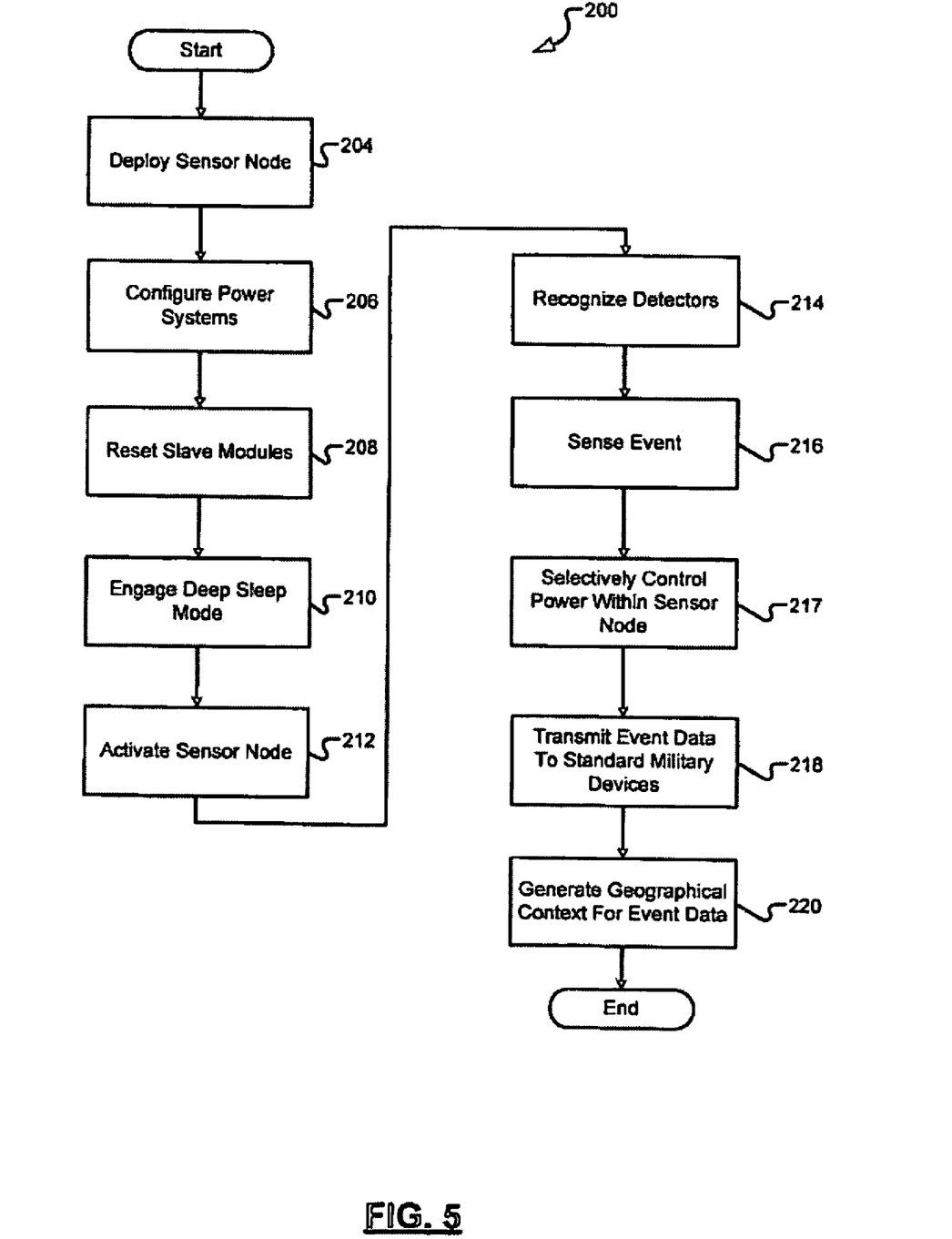
FIG. 5 is a flowchart of a method for operating an intrusion detection and surveillance system according to the present disclosure.

Referring now to FIG. 5, a flowchart 200 illustrates a method for operating a surveillance system according to the present disclosure. Control starts in step 204 when a sensor node including a sensor and a plurality of detectors is deployed. In step 206, the master control module resets the slave modules. In step 208, the sensor node is put in a deep sleep mode either directly or through remote control. In deep sleep mode, the main control module power down all the slaves and wait for an activation signal. In step 210, the sensor node activates in response to an activation signal. Each grouping or each sensor function module is capable of fully static or DC operation and resumes fully active status.

In step 212, the sensor node configures both detector and sensor power systems so that minimal power is consumed during operation of the sensor node. In step 214, the sensor recognizes (e.g. classify and determine type of) the detectors.

In step 216, following deployment, one or all of the detectors sense an event, such as a military vehicle and/or troop movement, in a zone of detection. In step 217, the master control module selectively controls the slave modules based on the event, and the slave modules selectively control power and clock functions for signal processing modules in the sensor node. In step 218, the sensor node transmits event data to standard military handheld radios and/or manpack radios. This includes activation of the slave modules that control functions of the transceiver and/or GPS. In step 220, a situational awareness application generates a visual geographical context based on handheld radio and/or manpack radio signals.

In operation, a method for operating a sensor system includes receiving a signal in a first slave module that controls a first set of sensor system operations external to a main control module that indicates a detected event has occurred. The slave module then determines system requirements for processing the signal and may signal the main control module of the system requirements for processing the signal. The method then includes processing the signal in through the first set of sensor system operations while powering down the first set of sensor system operations when the first set of sensor system operations are completed on the signal. The method also includes activating a second slave module to further process the signal in a second set of sensor system operations.

The method still further includes powering down the sensor system in a deep sleep mode where all sets of sensor system operations run at minimal operating power, wherein minimal operating power may include complete deactivation. The first set of sensor system operations includes automatically classifying the one of X detectors as one of an analog detector and a digital detector, where X is an integer greater than 1. The operations also include selectively generating detector identification information based on the classification. The method further includes automatically generating an identification signal that indicates a detector type of the one of X detectors based on the detector identification information. Power for the sensor system may be regulated based on the detector type.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A sensor system comprising:
    an external detector that generates an electrical signal in response to a physical stimulus proximate to the sensor system;
    an interface that receives the electrical signal from the detector and determines a detector type for the detector;
    N sensor system modules that each include respective sensor function modules for processing and communicating signals from at least one external detector;
    M slave modules such that one slave module is associated with each of the sensor system modules and selectively control power to said sensor function modules in the associated sensor system module, where M and N are integers greater than one;
    a bus; and
    a master power control module that serially controls said M slave modules via said bus based on functions of said sensor function modules and regulates power for the N sensor system modules based on the detector type of the detector.

2. The sensor system of claim 1 wherein at least one of said N sensor system modules, said M slave modules, said bus, and said master power control module are software reprogrammable.

3. The sensor system of claim 1 wherein said interface comprises:
    a classification module that communicates with said port and classifies one of X external detectors as one of an analog detector and a digital detector;
    a detector discovery module that determines that said one of X external detectors is connected based on communications with said classification module;
    a detector identification (ID) module that generates an identification signal that indicates a detector type of said one of X external detectors based on communications with said classification module; and
    an algorithm selection module that selects a control algorithm that processes signals from said one of N external detectors based on said detector type, wherein said master power control module signals a second of said M slave modules to process signals from said interface based on said first of said M slave modules notifying said master power control module of said control algorithm.

4. The sensor system of claim 1 wherein said bus comprises a master and slave mode and a master and master mode.

5. A sensor node that comprises the interface of claim 1 further comprising:
    said X external detectors;
    a signal processing module that communicates with said X external detectors and that is operable to generate event messages based on said communications;
    at least one of a global positioning system and a radio frequency (RF) transceiver that may transmit said event messages over a wireless link; and
    a channel access module operable to negotiate access to the wireless link.

6. The sensor node of claim 5 further comprising an internet protocol (IP) sub-net that processes signals from the signal processing module; and an encryption module that encrypts IP sub-net signals.

7. The sensor node of claim 5 wherein said one of N external detectors comprises at least one of a passive infrared (PIR) sensor, a seismic sensor, a magneto-resistive sensor, a radar sensor, a lidar sensor, an imaging sensor, and a smart acoustic sensor.

8. A surveillance system that comprises the sensor node of claim 5 further comprising:
    at least one of a standard military radio and a standard military pack radio that communicates wirelessly with said RF transceiver; and
    a situational awareness application that communicates wirelessly with said at least one of said military radio and said standard military pack radio and that displays data from said one of X external detectors.

9. A method for operating a sensor system comprising:
    receiving a signal in a first slave module that controls a first set of sensor system operations external to a main control module indicating a detected event has occurred;

determining system requirements for processing said signal;

signaling said main control module of said system requirements for processing said signal;

processing said signal through said first set of sensor system operations;

powering down said first set of sensor system operations when said first set of sensor system operations are completed on said signal; and activating a second slave module to further process said signal in a second set of sensor system operations.

10. The method of claim 9 further comprising powering down the sensor system in a deep sleep mode where all sets of sensor system operations run at minimal operating power, wherein minimal operating power may include complete deactivation.

11. The method of claim 9 further wherein said first set of sensor system operations comprises:

automatically classifying said one of X detectors as one of an analog detector and a digital detector, where X is an integer greater than 1;

selectively generating detector identification information based on said classification; and automatically generating an identification signal that indicates a detector type of said one of X detectors based on said detector identification information.

12. The method of claim 9 wherein said first set of sensor system operations further comprises selecting a control algorithm for processing signals from said one of X detectors based on said detector type.

13. The method of claim 12 further comprising regulating power for the sensor system based on said detector type.

14. A sensor system, comprising:

a detector that generates an electrical signal in response to a physical stimulus proximate to the sensor system;

a signal processor adapted to receive the electrical signal from the detector and operable to generate event messages based on the electrical signal;

a transceiver operable to send and receive messages over a wireless radio link;

a power source selectively connectable to the detector, the signal processor and the transceiver; and a master control module connected to the power source and operable to selectively control power consumption of two or more slave modules residing in the sensor system, wherein each slave module is in data communication with master control module and operable to selectively control power consumption of at least one other sensor component.

15. The sensor system of claim 14 wherein a switch is interposed between the power source and at least one of the slave modules and the master control module is operable to control the switch, thereby selectively connecting the power source to the at least one slave module.

16. The sensor system of claim 14 wherein a switch is interposed between the power source and the at least one other sensor component and the slave module is operable to control the switch, thereby selectively connecting the power source to the at least one other sensor component.

17. The sensor system of claim 14 wherein the master control module communicates over a serial communication link with the two or more slave modules.

18. The sensor system of claim 14 wherein the master control module and the two or more slave modules are further defined as 16-bit microprocessors.

19. The sensor system of claim 14 further comprises a first slave module operable to selectively control power consumption of the detector and the signal processor and a second slave module operable to selectively control power consumption of the transceiver.

20. A sensor apparatus, comprising:

a detector that generates an electrical signal in response to a physical stimulus proximate to the sensor system;

a signal processor adapted to receive the electrical signal from the detector and operable to generate event messages based on the electrical signal;

a transceiver operable to send and receive messages over a wireless radio link;

a slave module associated with each of the detector, the signal processor and the transceiver for selectively controlling power consumption thereof;

a master control module in data communication with each of the slave modules and operable to control each of the slave modules, wherein the signal processor, the transceiver, the master control module and the slave modules residing in a housing of the sensor apparatus.

21. The sensor apparatus of claim 20 further comprises a master clock associated with the master control module, wherein each slave module synchronizes the master clock with clocks associated with each of the detector, the signal processor and the transceiver.

22. The sensor apparatus of claim 20 further comprises a switch is interposed between a power source and at least one of the slave modules and the master control module is operable to control the switch, thereby selectively connecting the power source to the at least one slave module.

23. The sensor apparatus of claim 20 further comprises a switch is interposed between a power source and at least one other sensor component, and the slave module is operable to control the switch, thereby selectively connecting the power source to the at least one other sensor component.

* * * * *